United States Patent
Wang et al.

(10) Patent No.: US 6,485,171 B1
(45) Date of Patent: Nov. 26, 2002

(54) APPARATUS AND METHOD FOR SENSING THE FLUID LEVEL IN A MIXING DEVICE

(75) Inventors: Xin Xin Wang, Naperville, IL (US); Thaddeus A. Niemiro, Lisle, IL (US); Joseph Vucko, Lemont, IL (US); James K. Henzl, Worth, IL (US)

(73) Assignee: Goss Graphic Systems, Inc, Westmont, IL (US)

( * ) Notice: Subject to any disclaimer, the term of this patent is extended or adjusted under 35 U.S.C. 154(b) by 0 days.

(21) Appl. No.: 09/459,665

(22) Filed: Dec. 13, 1999

(51) Int. Cl.[7] .......................... B01F 15/00; B41F 31/02
(52) U.S. Cl. .................. 366/153.1; 73/290 R; 340/618
(58) Field of Search ............................. 366/142, 151.1, 366/152.6, 153.1; 137/101.25, 392; 73/290 R, 304 R; 340/612, 613, 615, 618, 625

(56) References Cited

U.S. PATENT DOCUMENTS

| | | | |
|---|---|---|---|
| 1,737,609 A | * | 12/1929 | Nielsen |
| 2,762,390 A | | 9/1956 | Rodenacker |
| 2,798,214 A | * | 7/1957 | Rowell |
| 3,181,848 A | | 5/1965 | Miller, Jr. |
| 3,311,834 A | | 3/1967 | Barker |
| 3,495,808 A | | 2/1970 | Klein et al. |
| 3,570,532 A | * | 3/1971 | Lendino |
| 3,580,158 A | | 5/1971 | Scholle et al. |
| 3,606,271 A | | 9/1971 | Schmidt et al. |
| 3,670,923 A | | 6/1972 | Hawes, Jr. et al. |
| 3,697,052 A | | 10/1972 | Andris |
| 3,747,084 A | | 7/1973 | Hartung |
| 3,848,529 A | | 11/1974 | Gegenheimer et al. |
| 3,877,682 A | | 4/1975 | Moss |
| 3,882,967 A | * | 5/1975 | Gulla et al. |
| 3,948,490 A | * | 4/1976 | Troope |
| 4,329,923 A | | 5/1982 | Iida |
| 4,362,033 A | * | 12/1982 | Young |
| 4,445,238 A | | 5/1984 | Maxhimer |
| 4,474,476 A | * | 10/1984 | Thomsen |
| 4,571,092 A | * | 2/1986 | Switall ....................... 366/348 |
| 4,841,321 A | | 6/1989 | Kose et al. |
| 5,105,739 A | | 4/1992 | Osawa et al. |
| 5,427,136 A | | 6/1995 | Weishew |
| 5,592,868 A | * | 1/1997 | Asai et al. |
| 5,694,974 A | | 12/1997 | Niemiro et al. |
| 5,951,161 A | * | 9/1999 | Blagg |
| 6,167,756 B1 | * | 1/2001 | Everson, Jr. et al. |

FOREIGN PATENT DOCUMENTS

| | | | |
|---|---|---|---|
| GB | 1128175 | | 9/1968 |
| GB | 2114906 | * | 9/1983 |
| JP | 55-137032 | * | 10/1980 |
| JP | 2000-218611 | * | 8/2000 |

* cited by examiner

*Primary Examiner*—Charles E. Cooley
(74) *Attorney, Agent, or Firm*—Marshall, Gerstein & Borun

(57) ABSTRACT

A sensor for detecting the level of circulating fluid in a tank comprises a paddle blade disposed at a particular height and oriented generally radially from a rotating shaft in the tank. A sensing device, such as a strain gauge, is attached to the paddle blade to detect when the paddle blade is in at least one of a normal and a displaced position, thereby indicating that fluid is absent or present at a particular level. Additional sensors may be used in the same tank to provide fluid level feedback at more than one height.

23 Claims, 5 Drawing Sheets

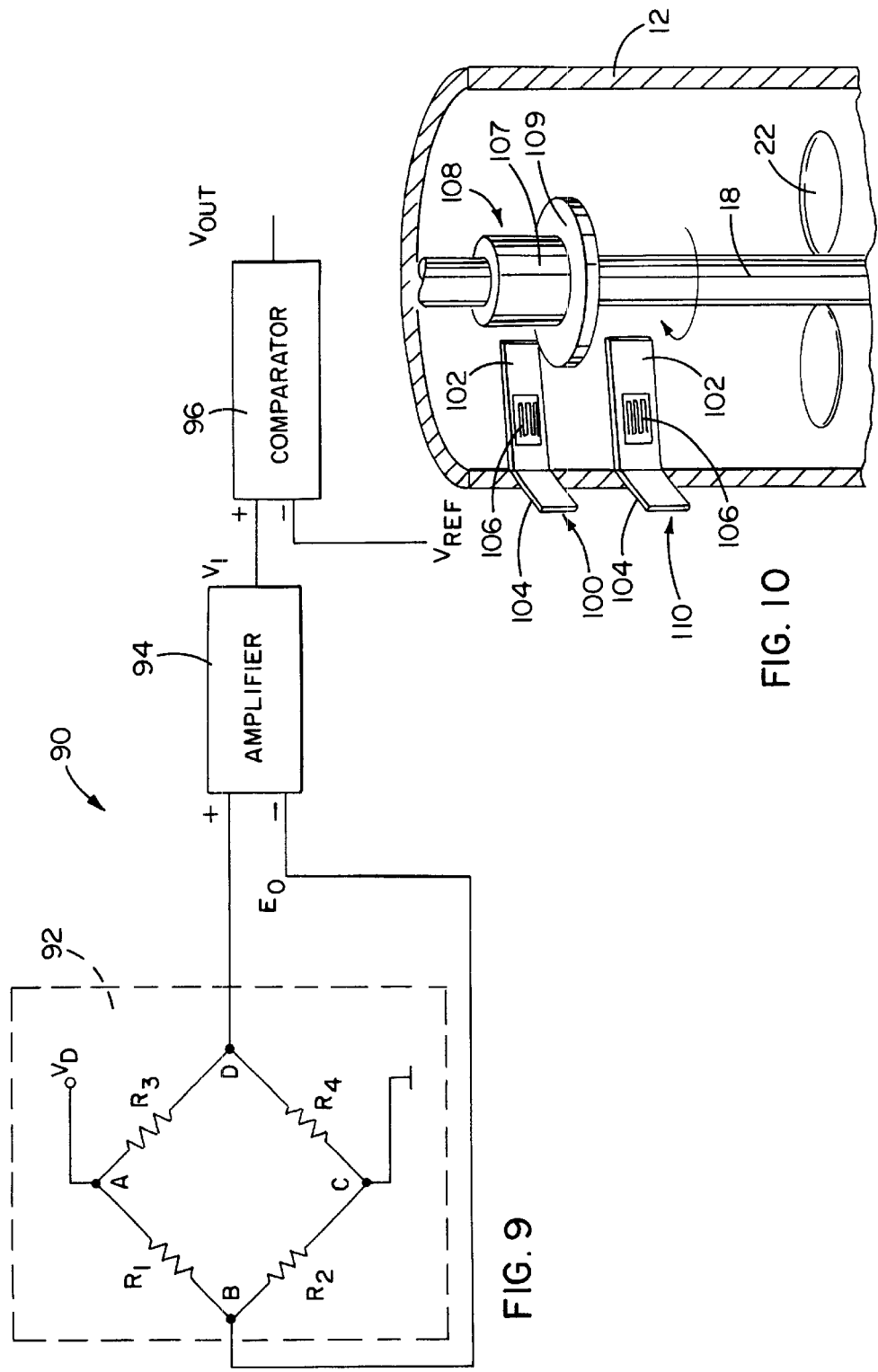

APPARATUS AND METHOD FOR SENSING THE FLUID LEVEL IN A MIXING DEVICE

FIELD OF THE INVENTION

The present invention generally relates to level sensing apparatus, and more particularly to fluid level sensors used in mixing devices.

BACKGROUND OF THE INVENTION

Various types of commercial processes require a supply of liquid, which is commonly provided in a vessel. As the commercial process continues, the level of liquid in the vessel drops. It is important in many instances to maintain a desired level of liquid within the vessel. In a single fluid printing press which uses a pre-mixed ink/water emulsion to form images on paper, for example, a source of ink/water emulsion must continuously supply the fluid during the course of the printing operation. Such presses include a vessel which houses a mixing device for blending the ink and water. The mixing device typically rotates on the order of 1000–2000 rpm to vigorously and thoroughly mix the ink and water to obtain the ink/water emulsion. Accordingly, the vessel is substantially closed, to prevent fluid from leaking. The ink/water emulsion is then supplied to the press to print images on paper.

As is known in the art, it is common to provide a liquid level sensor to provide feedback regarding the amount of fluid in the vessel. Most commonly, control systems for maintaining the level of liquid in a vessel have utilized a float element that is supported on the surface of the liquid. This type of control system depends upon the float element riding up and down as the level of the liquid fluctuates within the vessel to activate respective off and on switches to control suitable valves for selectively replenishing the liquid from a remote source. More specifically, the actuation of the switches that control the valves is typically accomplished either mechanically or by energizing a proximity sensing device. Generally speaking, such control systems are well proven and quite reliable for most applications. They are known to be unsuitable, however, for use in an ink environment, due substantially to the fact that ink has a high viscosity and tack which causes it to adhere to the float element. Accordingly, the buoyancy and weight of the float element in this type of control system is known to change dramatically. As a result, the control system is known to be difficult, at best, to maintain in calibration within an ink environment.

An alternative float-type provides a regulated supply of low pressure air to the vessel through an air supply tube. A bottom end of the air supply tube is positioned at a preselected level within the liquid vessel. An air flow meter having a pressure-responsive floating element in an internal chamber is connected to the air supply tube to sense fluctuations in air pressure. The floating element is movable between a first position and a second position depending upon the air pressure which is sensed in the air supply tube. When the liquid level in the vessel is above the preselected level, the air supply tube is under a higher pressure and the float element of the air flow meter is in the first position. When the liquid level drops below the preselected level, the pressure in the air supply tube drops and the float element of the air flow meter moves to the second position. A liquid supply valve operates according to the position of the float element, so that it is closed when the float element is in the first position, and is open when the float element is in the second position. While this alternative removes the float element from the vessel to avoid the problems noted above, the ink tends to clog the air supply tube, rendering the flow meter useless. As a result, a supply of high pressure air is often needed to unclog the tube by blasting air through the tube. This approach not only requires additional components, but must also be used with open or vented vessels so that the pressurized air supplied to the vessel may escape, and therefore is not suitable for single-fluid printing press applications.

U.S. Pat. No. 5,694,974 describes yet another type of fluid level detection system. The system of the '974 patent comprises a vessel for collecting ink. A rotating shaft is disposed inside the vessel, and upper and lower flexible blades are attached to the rotating shaft. Upper and lower proximity sensors are positioned at the respective heights of the upper and lower blades. When one of the blades is unimpeded by ink, the blade remains straight and actuates the associated proximity sensor as it passes the sensor. When the level of ink in the vessel reaches a blade, that blade flexes due to the viscosity of the ink, to form a greater gap between the proximity sensor and the blade, such that the sensor does not detect the blade. It will be appreciated that for such a system to be effective, the ink must be relatively inert or unmoving so that the blades will bend when submerged in ink. If the shaft rotates too fast, such that the ink circulates in with the shaft, the blades will not flex when submerged. In such systems, therefore, the shaft typically rotates on the order of 60 rpm, which is not suitable for mixing ink and water as needed in a single fluid printing press.

Ultrasound instruments have also been used to control the level of liquid in a vessel. The ultrasound instruments function by detecting an acoustic wave which is reflected from a surface of the liquid in the vessel and by measuring the time which elapses between the emission and detection of the wave thereby to calculate the distance of the liquid surface from the instrument. Unfortunately, the ultrasound instruments are quite unreliable in an ink environment inasmuch as the ink surface is quite irregular, especially when mixed vigorously, thereby preventing a proper reflection of the acoustic wave.

The present invention is directed to overcoming one or more of the foregoing problems and achieving one or more of the resulting objects.

SUMMARY OF THE INVENTION

According to certain aspects of the present invention, apparatus is provided for detecting a fluid level in a tank of circulating fluid. The apparatus comprises a paddle blade supported inside the tank at a particular level, the paddle blade oriented to resist fluid circulation in the tank and moveable between a normal position and a displaced position. The apparatus further comprises a detector for sensing when the paddle blade is in at least one of the normal and displaced positions and generating a fluid level signal. The circulating fluid acts to move the paddle blade from the normal position to the displaced position so that the fluid level signal is generated responsive to the level of the circulating fluid.

In accordance with additional aspects of the present invention, apparatus for mixing fluid is provided comprising a tank for holding fluid, a rotatable shaft supported inside the tank, and an impeller attached to the shaft for mixing fluid in the tank, thereby circulating the fluid. A paddle blade is supported inside the tank at a particular level, the paddle blade oriented to resist the circulating fluid in the tank and being moveable between a normal position and a displaced position. A detector is provided for sensing when the paddle blade is in at least one of the normal and displaced positions and for generating a fluid level signal. The paddle blade is adapted to move toward the displaced position when the circulating fluid reaches the particular level.

In accordance with additional aspects of the present invention, a method is provided of sensing the presence of circulating fluid in a tank at a particular height. The method comprises the steps of supporting a paddle blade inside the tank at the particular height, the paddle blade moveable between a normal position and a displaced position, and detecting when the paddle blade is in at least one of the normal and displaced positions and generating a signal. The paddle blade will move from the normal position to the displaced position when the circulating fluid is present at the particular height in the tank.

BRIEF DESCRIPTION OF THE DRAWINGS

FIG. 9 is a block diagram of a sensor circuit for use with certain embodiments of the present invention using a strain gauge.

FIG. 10 is a perspective view, in cross-section, of a further embodiment of the present invention incorporating two fluid level sensors.

DETAILED DESCRIPTION OF THE PREFERRED EMBODIMENTS

Figure 1:
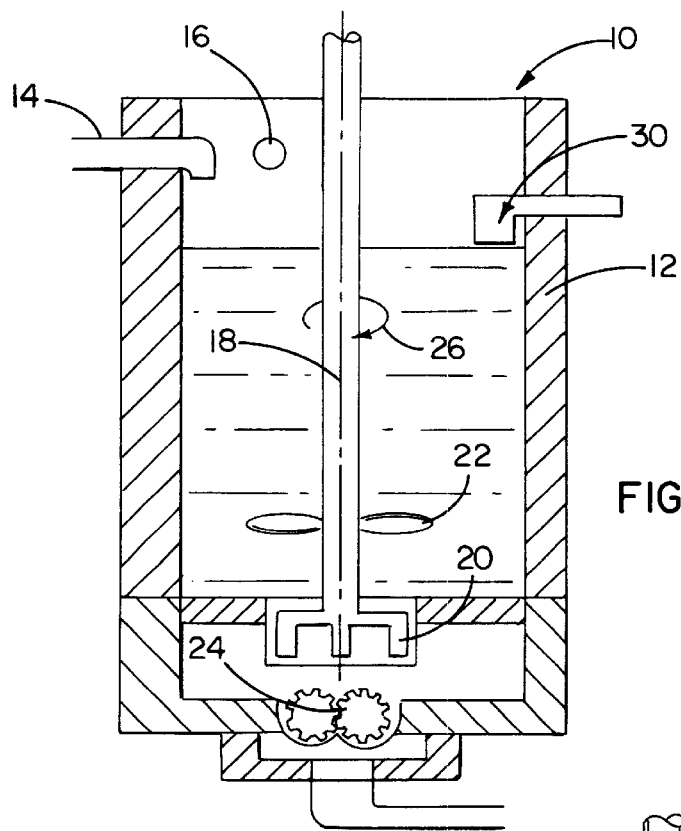
FIG. 1 is a side view, in cross-section, of a mixing device incorporating a fluid level sensor in accordance with the present invention.

Referring now to FIG. 1, a mixing device 10 is illustrated for mixing two fluids, e.g., ink and water. The mixing device 10 comprises a tank 12 having a water intake port 14 and an ink intake port 16. A shaft 18 is disposed inside the tank 12 and is supported for high speed rotation, e.g. on the order of 1000–2000 rpm. An impeller 22 is attached to an intermediate portion of the shaft 18 to pre-mix the ink and water into an ink/water emulsion. During mixing, it will be appreciated that the fluid in the tank 12 circulates in the same direction as the rotation of the impeller 22. For example, the circular flow may be clockwise when viewed from above, as illustrated by the arrow 26 in FIG. 1. A final mixing blade 20 is attached to a bottom of the shaft 18 to more thoroughly mix the ink and water. An outlet pump 24, is located at a bottom of the tank 12 for pumping mixed fluid to, e.g., a printing press (not shown) to produce images on a paper surface.

Figure 2:
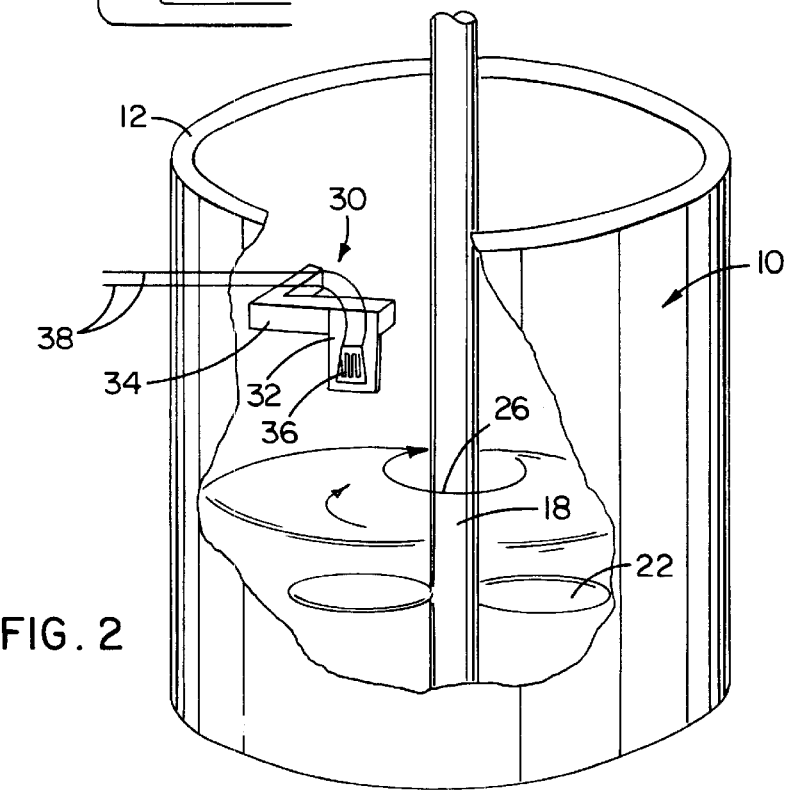
FIG. 2 is a perspective view, in partial cutaway, of a mixing device incorporating the same embodiment of the fluid level sensor illustrated in FIG. 1.

In accordance with certain aspects of the present invention, a sensor 30 is provided for detecting rotational movement of the fluid inside the tank 12. According to the embodiment illustrated in FIG. 2, the sensor 30 comprises a paddle blade 32 supported inside the tank 12 at a particular height. A support 34, such as an L-bracket, is attached to an inside wall of the tank 12 at one end and supports the paddle blade 32 at an opposite end. To maximize the effectiveness of the sensor 30, the support 34 preferably holds the paddle blade 32 so that it is oriented substantially radially of the shaft 18. Such an orientation will increase a resisting force in the paddle blade 32 resulting from the circulating fluid. A strain gauge 36 is attached to at least one surface of the paddle blade 32 for detecting deflections in the paddle blade 32. The strain gauge 36 is electrically connected to a sensing circuit (such as that shown in FIG. 9 and described in greater detail below) by lead wires 38.

When the shaft 18 rotates, the fluid in the tank 12 circulates as noted above. If the fluid level in the tank 12 is high enough to contact the paddle blade 32, the fluid acts to slightly deflect the paddle blade 32 in the direction of the rotating fluid. The bending of the paddle blade 32 alters the resistance of the strain gauge 36, thereby indicating that fluid is present at the level of the paddle blade 32. When the resistance in the strain gauge 36 changes more than a predetermined threshold level, the sensing circuit 90 (FIG. 9) produces an output signal indicating that the fluid level has reached the predetermined level. When the fluid level falls below the paddle blade 32, the paddle blade 32 will return to its original, undeflected position and the output signal of the sensing circuit 90 ceases, thereby indicating that the fluid level has fallen below the predetermined level. In the preferred embodiment, the paddle blade 32 is preferably formed of a flexible material, such as sheet metal, to insure that the paddle blade 32 and attached strain gauge 36 will bend, thereby altering the resistance of the strain gauge 36.

Figure 3:
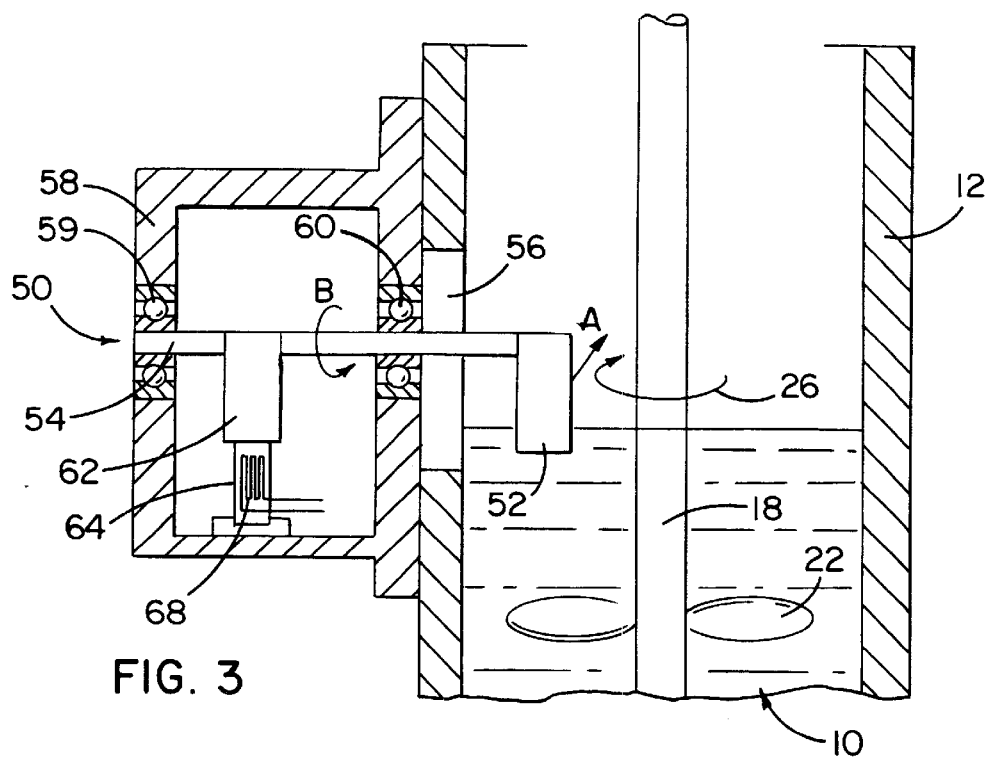
FIG. 3 is a side view, in cross-section, of another embodiment of a fluid level sensor in accordance with the present invention.
Figure 4:
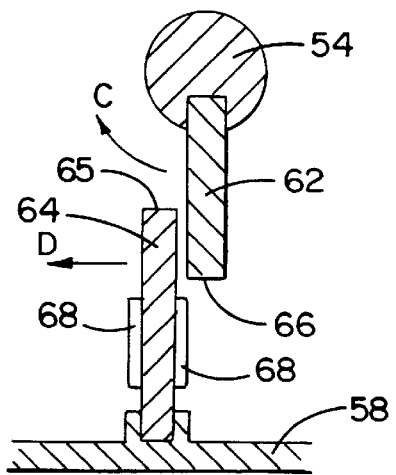
FIG. 4 is an end view, in cross-section, of certain components of the fluid level sensor illustrated in FIG. 3.

FIGS. 3 and 4 illustrate an additional embodiment of the present invention. As best shown in FIG. 3, a level sensor 50 is attached to a mixing device 10 similar to the mixing device of FIG. 1. Accordingly, the mixing device 10 includes a tank 12, a rotatable shaft 18, and an impeller 22 attached to the shaft 18. The sensor 50 comprises a paddle blade 52 attached to a support shaft 54 extending through an aperture 56 in a wall of the tank 12. Similar to the previous embodiment, the paddle blade 52 is preferably supported so that it is positioned generally radially of the shaft 18. A housing 58 is attached to an exterior of the tank 12 and has first and second bearings 59, 60 journally supporting the support shaft 54. An indicating blade 62 is attached to an intermediate portion of the support shaft 54 extending between the first and second bearings 59, 60. A spring blade 64 is attached to a bottom of the housing 58 and projects vertically upward so that a top edge 65 overlaps a bottom edge 66 of the indicating blade 62. A strain gauge 68 is attached to the spring blade 64 for detecting deflection in the spring blade 64.

In operation, when the shaft 18 rotates in the direction indicated by arrow 26, the fluid in the tank 12 is mixed and circulates in the same direction. The circulating fluid generates a push force on the paddle blade 52 which move the paddle blade 52 in a direction indicated by arrow "A". The movement of the paddle blade 52 in the direction "A" rotates the support shaft 54 in a direction "B" (FIG. 3), which also rotates the attached indicating blade 62 in a direction "C" (FIG. 4). When the indicating blade 62 moves in the direction "C", it engages and deflects the spring blade 64 in a direction "D", thereby altering the resistance in the attached strain gauge 68. A sensing circuit, such as sensing circuit 90 (FIG. 9), is attached to the strain gauge 68 to amplify the resistance change and provide an output signal indicating that fluid has reached the predetermined level. It will be understood that the deflected spring blade 64 exerts a return force which biases the indicating blade 62 toward its original position. When the fluid in the tank 12 is at the level of the paddle blade 52, the push force generated by the circulating fluid is transferred to the indicating blade 62 by the support shaft 54 and is large enough to overcome the return force of the spring blade 64, so that the spring blade 64 deflects. When the fluid level falls below the paddle blade 52, the push force dissipates so that the return force of the spring blade 64 forces the indicating blade 62 back to its original position. The spring blade 64, therefore, also returns to its normal position to deactivate the output signal of the sensing circuit 90. In addition, it will be understood that as the indicating blade 62 returns to its original position, the paddle blade 52 also returns to its original position.

Figure 5:
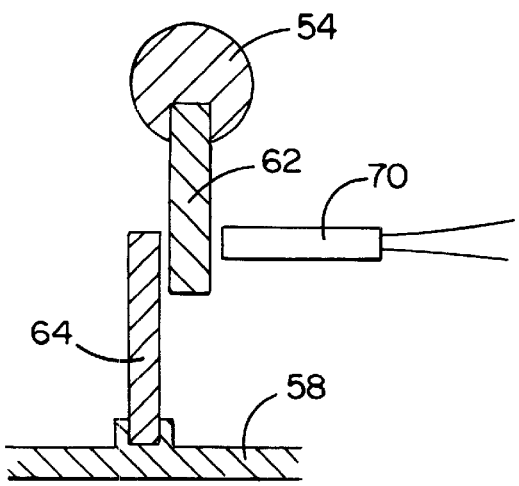
FIG. 5 is an end view, in cross-section, of an additional embodiment of the fluid level sensor in accordance with the present invention, the embodiment being similar to that illustrated in FIGS. 3 and 4.
Figure 6:
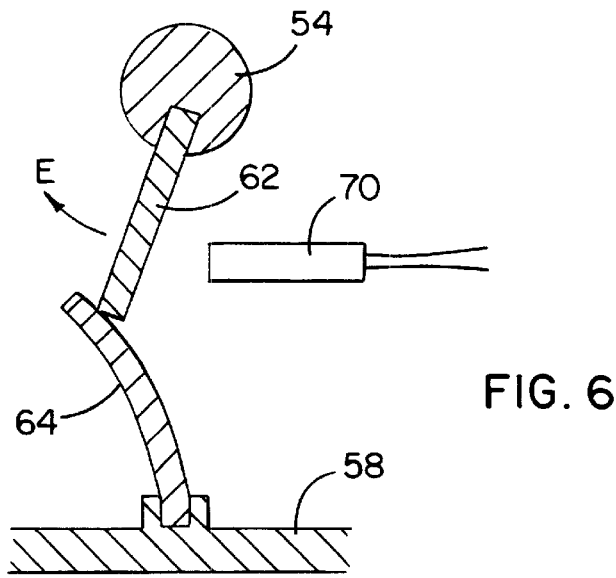
FIG. 6 is an end view, in cross-section, of the fluid level sensor of FIG. 5 in a displaced position.

The strain gauge 68 used in the previous embodiment may be replaced by other types of detecting devices. For example, a proximity sensor 70 may be used to detect the position of the indicating blade 62 (see FIG. 5). The proximity sensor 70 is preferably a metallic sensor, since the indicating blade 62 is preferably formed of metal, but may be another type of sensor, such as an optical sensor, when the indicating blade 62 is formed of a non-metallic material. The proximity sensor 70 is positioned near the indicating blade 62 when it is in a normal position, as illustrated in FIG. 5. When fluid is present at the particular level, the paddle blade 52 deflects and the indicating blade 62 rotates, such as in a direction "E", to a displaced position outside of the range of the proximity sensor 70, as illustrated in FIG. 6. The spring blade 64 is preferably provided in this embodiment to return the indicating blade 62 to the normal position once the fluid in the tank 12 drops below the paddle blade 52.

Figure 11:
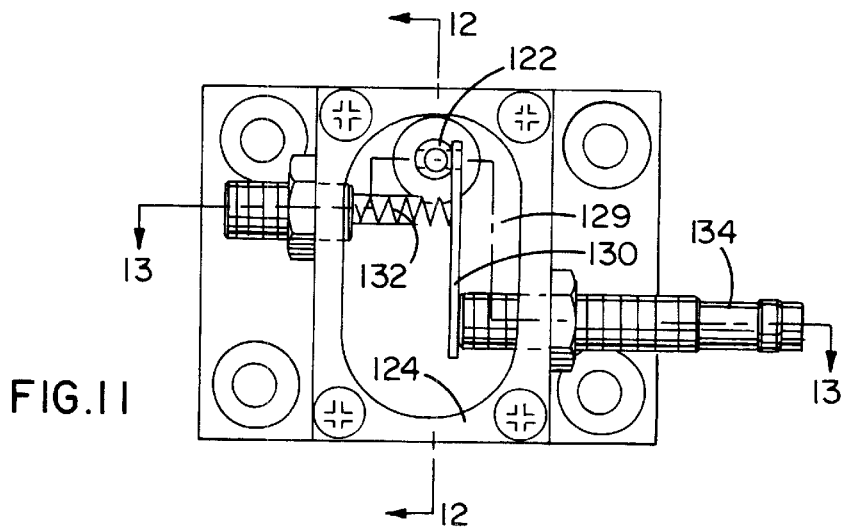
FIG. 11 is a side elevation view of a currently preferred embodiment of a fluid level sensor, in accordance with the teachings of the present invention.
Figure 12:
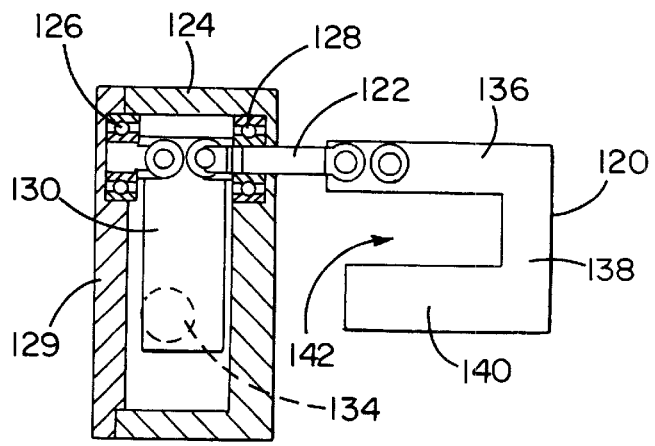
FIG. 12 is an end view, in cross-section, of the fluid level sensor taken along line 12—12 of FIG. 11.
Figure 13:
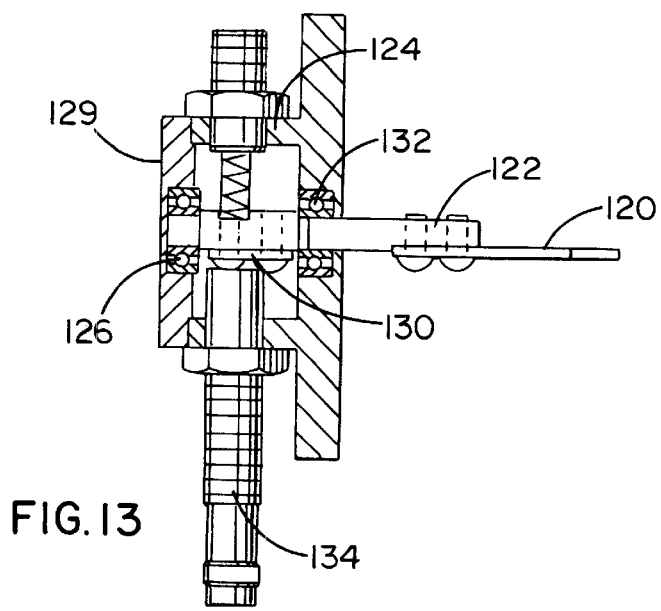
FIG. 13 is a top view, in cross-section, of the fluid level sensor taken along line 13—13 of FIG. 11.

A currently preferred embodiment of the fluid level detecting apparatus is illustrated in FIGS. 11–13. As illustrated in FIGS. 12 and 13, the apparatus comprises a paddle blade 120 adapted for insertion into a tank of circulating fluid, such as tank 12 illustrated in FIG. 1. The paddle blade 120 is attached to a support shaft 122 which extends through a sensor housing 124 and is journally supported by first and second bearings 126, 128. The sensor housing 124 preferably includes a cover 129 formed of a transparent material, such as clear plastic, which provides visual access to the interior of the sensor housing 124. An indicating blade 130 is attached to the support shaft 122 and is disposed inside the sensor housing 124. A compression spring 132 is supported inside the sensor housing 124 and engages one side of the indicating blade 130. A proximity sensor 134 is located on an opposite side of the indicating blade 130. The indicating blade 130 moves between a normal position, in which the spring 132 is fully extended and the proximity sensor 134 senses the blade 130, and a displaced position, in which the spring 132 is compressed and the proximity sensor 134 does not sense the blade 130. The proximity sensor 134 is coupled to a fluid control circuit (not shown) to send an open signal when the indicating 130 blade is in the normal position, and a close signal when the indicating blade 130 is in the displaced position.

In operation, when the paddle blade 120 does not contact fluid in the tank, the spring 132 is fully extended and the indicating blade 130 is held in the normal position to be sensed by the proximity sensor 134, which sends an "open valve" signal to the fluid control circuit. When the fluid level in the tank reaches the paddle blade 120, the paddle blade 120 rotates. The rotation of the paddle blade 120 is transferred through the support shaft 122 to the indicating blade 130, so that the indicating blade 130 moves toward the displaced position, compressing the spring 132. In the displaced position, the proximity sensor 134 no longer senses the indicating blade 130, and therefore sends a "close valve" signal to the fluid control circuit.

In the preferred embodiment, the paddle blade 120 has a general C-shape as best illustrated in FIG. 12. Accordingly, the paddle blade 120 comprises an attachment portion 136 for attachment to the support shaft 122, a connecting portion 138, and a contact portion 140. It will be appreciated that ink tends to adhere and build on the paddle blade so that it may bridge a gap between the paddle blade and the tank wall. The C-shape of the paddle blade 120 reduces the amount of blade surface located near the tank wall to minimize such bridging problems. In addition, the paddle blade 120 defines a recess 142 through which ink may flow, thereby reducing distortions in flow pattern as the fluid passes the blade 120. The connecting portion 138 creates a moment arm between the attachment portion 136 and the contact portion 140, so that a relatively small force acting on the contact portion 140 may overcome the force of the compression spring 132. The force required to overcome the spring 132 may be adjusted by changing the vertical position of the spring 132, as shown in FIG. 13, with respect to the indicating blade 130.

Figure 7:
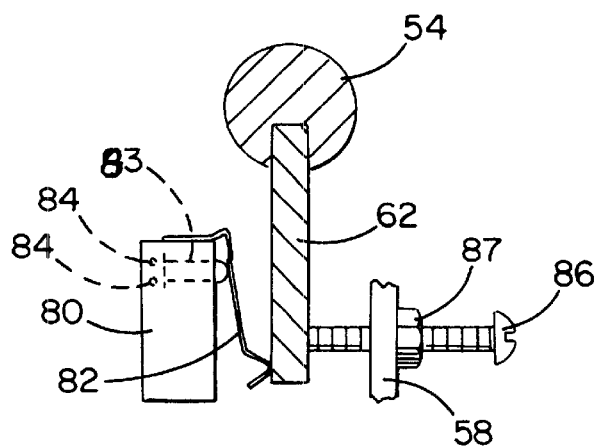
FIG. 7 is an end view, in cross-section, of an additional embodiment of a fluid level sensor in accordance with the present invention similar to the embodiments illustrated in FIGS. 3–6.
Figure 8:
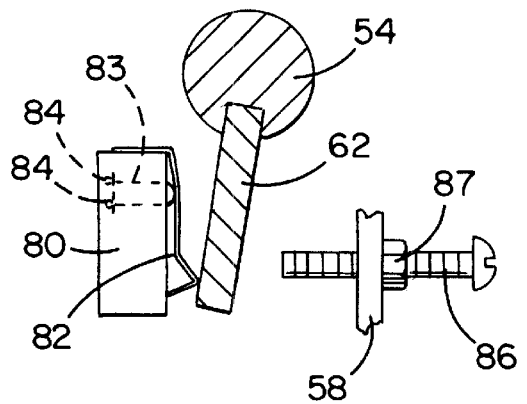
FIG. 8 is an end view, in cross-section, of the fluid level sensor of FIG. 7 in a displaced position.

A further embodiment using yet another detecting device is illustrated in FIGS. 7 and 8. As shown in FIG. 7, a mechanical switch 80 is provided for detecting the position of the indicating blade 62. The mechanical switch 80 has a pivoting lever 82 in contact with a spring loaded pin 83 which is biased away from contacts 84. When the fluid level reaches the paddle blade 52, the indicating blade 62 rotates clockwise as shown in FIG. 8, to push the lever 82 against the pin 83, thereby moving the pin 83 against the spring force until the pin 83 engages the contacts 84, as best illustrated in FIG. 8. When the pin 83 engages the contacts 84, an output signal is generated indicating that a predetermined fluid level has been reached. When the fluid level drops below the paddle blade 52, the indicating blade 62, pin 83, and lever 82 return to the normal positions illustrated in FIG. 7. In a most preferred embodiment, an adjustment screw 86 is provided for holding the indicating blades 62 and attached paddle blade 52 in the normal position and for adjusting sensitivity of the mechanical switch 80. The adjustment screw 86 is mounted through a tapped hole in the housing 58 and secured by a locking nut 87.

FIG. 9 is block diagram of a preferred sensor circuit 90 for use with a sensor having a strain gauge. Four strain gauge elements R1, R2, R3, and R4 of a strain gauge device 92 are connected as a full bridge. An excitation voltage $V_0$ is applied between points A and C of the bridge. The voltage output of the bridge $E_0$ is picked up between points B and D of the bridge and applied to differential inputs of an amplifier 94. The amplifier 94 outputs an amplified signal $V_1$ to an input of a voltage comparator 96, while a second input of the voltage comparator 96 is connected to a reference voltage $V_{ref}$. When the strain gauge device 92 bends, the output voltage $V_1$ is increased. When the output voltage $V_1$ becomes greater than the reference voltage $V_{ref}$, a comparator output voltage $V_{out}$ will increase, indicating that a predetermined fluid level has been reached. The circuit 90 may be used with any of the strain gauge devices described herein, including the strain gauges 36 and 68 described above.

A further embodiment, capable of providing fluid level feedback at first and second levels, is illustrated in FIG. 10. In this embodiment, upper and lower sensors 100, 110 are attached at upper and lower levels in the tank 12. Each of the sensors 100, 110 includes a paddle blade 102 supported to have a generally radial orientation from the shaft 18. In this embodiment, the paddle blades 102 have an L-shape to provide an integral support 104 attached to an interior surface of the tank 12. A strain gauge 106 is attached to each paddle blade 102. The paddle blades 102 are preferably formed of a flexible material so that the paddle blades 102 bend when circulating fluid contacts the paddle blade. The strain gauges 106 detect the deflection of the paddle blades 102 and are connected to sensor circuits such as 90 (FIG. 9), which provide output signals. As a result, fluid level feedback may be provided indicating fluid level at more than one particular height. In a most preferred embodiment, the paddle blades 102 are formed of spring steel having a thickness of approximately 0.003 inches and a width of about 0.4 inches.

In the embodiment illustrated in FIG. 10, the mixing device 10 preferably further includes a sleeve 108 for increasing fluid circulation near the upper sensor 100. The sleeve 108 includes a collar portion 107 and an annular flange portion 109 extending radially outwardly from the collar portion 107. The sleeve 108 is attached to and rotates with the shaft 18 so that, when the sleeve 108 is submerged in fluid, the flange portion 109 increases circulation of fluid near the sleeve 108. The sleeve 108 is preferably positioned between the upper and lower sensors 100, 110 so that fluid circulation is increased near the upper sensor 100, thereby creating a stronger signal in the strain gauge 106 attached thereto.

While not specifically described above, it will be appreciated that the sensor circuit 90 can be used for automatic refilling of the tank with fluid. For instance, in the embodiment of FIG. 10, the sensor 100 could be a high level sensor whereas the sensor 110 could be a low level sensor. Thus, when the fluid is at the level of the high level sensor 100, the paddle blade 102 associated with it will be deflected causing a certain comparator output voltage $V_0$ indicative of a full tank 12. This output voltage from the high level sensor 100 can be used to close and then maintain a fill valve in the closed position. Thereafter, when the fluid drops below the level of the low level sensor 110, the paddle blade 102 associated with it (which has been deflected) will return to an undeflected position causing a certain output voltage (e.g., 0) indicative of a low fluid level in the tank 12. This output voltage from the low level sensor 110 can be used to open and then maintain the fill valve in the open position. Only when the fluid again reaches the level of the high level sensor 100 will the fill valve once again be closed. While this is one example of an application for the detecting apparatus of the present invention, other applications of the apparatus described and claimed herein will be readily apparent to those skilled in the art.

In view of the foregoing, it will be appreciated that the present invention provides new and improved apparatus for detecting fluid level in a tank. The apparatus detects rotational movement of the fluid by providing a paddle blade positioned at a particular height in the tank. The paddle blade is moveable to a displaced position in response to circulation of the fluid. A sensor is provided for detecting when the paddle blade is in a displaced or an undisplaced position. The detection of the position of the paddle blade can be used for various purposes. As a result, a more compact level sensor is provided which decreases the amount of space needed inside the tank.

What is claimed is:

1. Apparatus for detecting a fluid level comprising:
    a tank for holding fluid;
    a rotating shaft disposed inside the tank;
    an impeller attached to the shaft for circulating fluid inside the tank;
    a paddle blade coupled to the tank and positioned inside the tank at a particular level, the paddle blade extending substantially radially with respect to the shaft and being moveable between a normal position and a displaced position; and
    a detector for sensing when the paddle blade is in at least one of the normal and displaced positions and generating a fluid level signal;
    wherein the circulating fluid at the particular level moves the paddle blade from the normal position to the displaced position so that the fluid level signal is generated responsive to the level of circulating fluid.

2. The apparatus of claim 1, in which the paddle blade is formed of a flexible material and the detector comprises a strain gauge attached to the paddle blade.

3. The apparatus of claim 1, in which the paddle blade is attached to a first end of a rotatable support shaft extending through a wall of the tank and an indicating blade is attached to a second end of the support shaft.

4. The apparatus of claim 3, further comprising a spring blade positioned to engage the indicating blade and moveable between normal and flexed positions, and in which the detector comprises a strain gauge attached to the spring blade.

5. The apparatus of claim 3, in which the detector comprises a proximity sensor positioned near the indicating blade.

6. The apparatus of claim 3, in which the detector comprises a mechanical switch.

7. The apparatus of claim 1, further comprising:
    a second paddle blade coupled to the tank and positioned inside the tank at a second level, the second paddle blade extending substantially radially with respect to the shaft and being movable between a normal position and a displaced position; and
    a second detector for sensing when the second paddle blade is in at least one of the normal and displaced positions and generating a second fluid level signal responsive to the level of the circulating fluid.

8. The apparatus of claim 1, in which the paddle blade has a general C-shape.

9. Fluid mixing apparatus comprising:
    a tank for holding fluid;
    a rotatable shaft supported inside the tank;
    an impeller attached to the shaft for mixing the fluid in the tank so that the fluid circulates in the tank;
    a paddle blade coupled to the tank and positioned inside the tank at a particular level, the paddle blade being movable between a normal position and a displaced position; and a detector for sensing when the paddle blade is in at least one of the normal and displaced positions, and generating a fluid level signal;

wherein the paddle blade moves toward the displaced position when the fluid reaches the particular level.

10. The apparatus of claim 9, further comprising:

a second paddle blade coupled to the tank and positioned inside the tank at a second level, the second paddle being movable between a normal position and a displaced position; and a second detector for sensing when the second paddle blade is in the displaced position and generating a second fluid level signal.

11. The apparatus of claim 10, in which the first and second detectors comprise first and second strain gauges attached to the first and second paddle blades, respectively.

12. The apparatus of claim 10, further comprising a sleeve attached to the shaft at an intermediate height between the first and second paddle blades, the sleeve having a collar portion closely fitting the shaft and a generally radially extending flange portion.

13. The apparatus of claim 9, in which the paddle blade is formed of a flexible material and the detector comprises a strain gauge attached to the paddle blade.

14. The apparatus of claim 9, in which the paddle blade is attached to a first end of a rotatable arm extending through a wall of the tank and an indicating blade is attached to a second end of the arm.

15. The apparatus of claim 14, further comprising a spring blade positioned to engage the indicating blade and moveable between normal and flexed positions, and in which the detector comprises a strain gauge attached to the spring blade.

16. The apparatus of claim 14, in which the detector comprises a proximity sensor positioned near the indicating blade.

17. The apparatus of claim 14, in which the detector comprises a mechanical switch.

18. A method of sensing the presence of fluid in a tank at a particular height, the method comprising the steps of:

circulating the fluid in the tank;

supporting a paddle blade inside the tank at the particular height, the paddle blade moveable from a normal position to a displaced position in response to the circulating fluid;

detecting when the paddle blade is in at least one of the normal and displaced positions and generating a signal;

wherein the paddle blade will move from the normal position to the displaced position when the fluid is present at the particular height in the tank.

19. The method of claim 18, in which the paddle blade is formed of a flexible material and the detecting step is performed by a strain gauge attached to the paddle blade.

20. The method of claim 18, in which the paddle blade is attached to one end of a shaft extending through a wall of the tank and an indicating blade is attached to an opposite end of the shaft, the detecting step being performed by a sensor associated with the indicating blade.

21. The method of claim 20, in which a spring blade engages the indicating blade and is moveable between normal and flexed positions, and the sensor comprises a strain gauge attached to the spring blade.

22. The method of claim 20, in which the sensor comprises a mechanical switch.

23. The method of claim 20, in which the sensor comprises a proximity sensor positioned near the indicating blade.

* * * * *